US010661663B2

(12) United States Patent
Zhang et al.

(10) Patent No.: US 10,661,663 B2
(45) Date of Patent: May 26, 2020

(54) BATTERY SYSTEM TEMPERATURE AND CHARGE ADJUSTMENT SYSTEM AND METHOD

(71) Applicant: CPS Technology Holdings LLC, New York, NY (US)

(72) Inventors: Zhenli Zhang, Glendale, WI (US); Zhihong H. Jin, Pewaukee, WI (US); Perry M. Wyatt, Fox Point, WI (US)

(73) Assignee: CPS Technology Holdings, LLC, New York, NY (US)

( * ) Notice: Subject to any disclaimer, the term of this patent is extended or adjusted under 35 U.S.C. 154(b) by 515 days.

(21) Appl. No.: 15/166,060

(22) Filed: May 26, 2016

(65) Prior Publication Data

US 2017/0225586 A1 Aug. 10, 2017

Related U.S. Application Data

(60) Provisional application No. 62/291,085, filed on Feb. 4, 2016.

(51) Int. Cl.
*B60L 58/24* (2019.01)
*B60L 11/18* (2006.01)
(Continued)

(52) U.S. Cl.
CPC ......... *B60L 11/1872* (2013.01); *B60L 3/0046* (2013.01); *B60L 11/1861* (2013.01);
(Continued)

(58) Field of Classification Search
CPC .............................. B60L 11/1872; B60L 58/24
(Continued)

(56) References Cited

U.S. PATENT DOCUMENTS 5,345,761 A * 9/1994 King ..................... B60L 1/12
180/65.245
6,464,027 B1 * 10/2002 Dage ..................... B60H 1/004
123/41.14
(Continued)

FOREIGN PATENT DOCUMENTS

CN 201985213 9/2011
CN 103682519 3/2014

OTHER PUBLICATIONS

Toyota Motor Engineering & Manufacturing North America, Inc., Use of Peltier Thermoelectric Module for Temperature Control of Battery During Charging of Electric and Hybrid Electric Vehicles, An IP.com Prior Art Database Technical Disclosure, Apr. 30, 2013.
(Continued)

*Primary Examiner* — Jerry D Robbins
(74) *Attorney, Agent, or Firm* — Boardman & Clark LLP (57) ABSTRACT

A battery system includes a battery module, a thermal management system, and a battery system controller. The controller is configured to receive data indicative of first operational conditions of the battery module and of second operational conditions of the thermal management system, determine a desired change to the first operational conditions of the battery module by determining an amount of power available to the thermal management system and to the battery module from one or more power sources, and to enable, to effect the desired change to the first operational conditions, the one or more power sources to provide a first quantity of power to the thermal management system and a second quantity of power to the battery module, and the thermal management system to heat or to cool the battery module to a calculated extent.

22 Claims, 3 Drawing Sheets

(51) Int. Cl.
*B60L 3/00* (2019.01)
*B60L 58/25* (2019.01)
*B60L 58/27* (2019.01)
*B60L 58/26* (2019.01)
*B60L 58/12* (2019.01)

(52) U.S. Cl.
CPC ....... *B60L 11/1874* (2013.01); *B60L 11/1875* (2013.01); *B60L 58/12* (2019.02); *B60L 58/24* (2019.02); *B60L 58/25* (2019.02); *B60L 58/26* (2019.02); *B60L 58/27* (2019.02); *B60L 2240/545* (2013.01); *B60L 2240/662* (2013.01); *Y02T 10/7005* (2013.01); *Y02T 10/705* (2013.01); *Y02T 10/7291* (2013.01); *Y02T 90/16* (2013.01)

(58) Field of Classification Search
USPC ........................................................ 320/109
See application file for complete search history.

(56) References Cited

U.S. PATENT DOCUMENTS

| | | | |
|---|---|---|---|
| 7,928,736 B2 | 4/2011 | Yun et al. | |
| 7,975,757 B2* | 7/2011 | Nemesh | B60H 1/00278 165/42 |
| 8,115,450 B2 | 2/2012 | Ambrosio et al. | |
| 8,679,659 B2 | 3/2014 | Claypole et al. | |
| 8,919,100 B2 | 12/2014 | Verbrugge et al. | |
| 9,105,951 B2* | 8/2015 | Anderson-Straley | H01M 10/625 |
| 2010/0291419 A1 | 11/2010 | Zhou | |
| 2013/0175022 A1* | 7/2013 | King | B60H 1/00392 165/202 |
| 2014/0014421 A1* | 1/2014 | Carpenter | H01M 10/5006 180/65.1 |
| 2014/0067183 A1 | 3/2014 | Sisk | |
| 2014/0216709 A1* | 8/2014 | Smith | B60H 1/00642 165/287 |
| 2014/0326430 A1 | 11/2014 | Carpenter et al. | |
| 2015/0280294 A1 | 10/2015 | Shin et al. | |
| 2015/0357692 A1 | 12/2015 | Piggott et al. | |
| 2016/0248129 A1* | 8/2016 | Dunham | H01M 10/625 |
| 2016/0288659 A1* | 10/2016 | Hammoud | B60L 11/187 |

OTHER PUBLICATIONS

Energy Storage R&D, Advanced Battery Development, 2013 Annual Progress Report, pp. 25-114.
Kwo Young et al., Electric Vehicle Battery Technologies, http://www.springer.com/978-1-4614-0133-9, pp. 15-56, Chapter 2, 2013.
Thomas Stuart et al., A Modular Battery Management System for HEVs, vol. 2002-01-1918, Jan. 19, 2002.
PCT/US2016/045050 International Search Report and Written Opinion dated Nov. 22, 2016.

\* cited by examiner

BATTERY SYSTEM TEMPERATURE AND CHARGE ADJUSTMENT SYSTEM AND METHOD

CROSS REFERENCE TO RELATED APPLICATIONS

This application claims priority from and the benefit of U.S. Provisional Application Ser. No. 62/291,085, entitled "SELF-ADJUST BATTERY SYSTEM TO SELF ADJUST BATTERY FUNCTION AND TEMPERATURE", filed Feb. 4, 2016, which is hereby incorporated by reference for all purposes.

BACKGROUND

The present disclosure relates generally to the field of batteries and battery modules. More specifically, the present disclosure relates to battery systems that may be used in vehicular contexts, as well as other energy storage/expending applications.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

Vehicles battery systems generally power features in the vehicle including the air conditioning, radio, alarm system, and other electronics. To reduce the amount of undesirable emissions products and improve the fuel efficiency of vehicles, improvements have been made to vehicle technologies. For example, some vehicles, such as a micro-hybrid vehicle, may disable the internal combustion engine when the vehicle is idling and utilize a battery system to continue powering the electronics as well as restarting (e.g., cranking) the engine when propulsion is desired. Additionally, some vehicles may utilize techniques, such as regenerative braking, to generate and store electrical power as the vehicle decelerates or coasts. More specifically, as vehicle reduces in speed, a regenerative braking system may convert mechanical energy into electrical energy, which may then be stored and/or used to power to the vehicle.

Unfortunately, traditional configurations generally do not utilize all the electrical energy generated from the regenerative braking system. Some electrical energy may be wasted or dumped. Further, battery systems do not generally operate at ideal or optimized conditions. Thus, as vehicle technologies (e.g., auto-stop and regenerative braking technology) continue to evolve, there is a need to provide improved power sources (e.g., battery systems or modules) for such vehicles. For example, it may be beneficial to improve usage of electrical energy generated via regenerative braking systems, and to optimize battery module conditions.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery system that includes a battery module, a thermal management system, and a battery system controller. The controller is configured to receive data indicative of first operational conditions of the battery module and of second operational conditions of the thermal management system, determine a desired change to the first operational conditions of the battery module by determining an amount of power available to the thermal management system and to the battery module from one or more power sources, and to enable, to effect the desired change to the first operational conditions, the one or more power sources to provide a first quantity of power to the thermal management system and a second quantity of power to the battery module, and the thermal management system to heat or to cool the battery module to a calculated extent.

The present disclosure also relates to a battery system controller having a processor and a memory, where the memory includes instructions stored thereon that, when executed by the processor, cause the processor to perform acts. The acts include determining a temperature of a battery module and a state of charge of the battery module, determining a heating or cooling capability of a thermal management system, determining an amount of power available, from one or more power sources, to the battery module and to the thermal management system, and determining a desired condition of the battery module based at least in part on the temperature of the battery module, the state of charge of the battery module, the amount of power available to the battery module or to the thermal management system, or a combination thereof. Further, the acts include causing, based at least in part on the desired first condition, the one or more power sources to provide to the thermal management system and to the battery module the amount of power available to the thermal management system and to the battery module, and the thermal management system to heat or cool the battery module to a calculated extent.

The present disclosure also relates to a method of charging a battery module. The method includes determining a temperature of the battery module, determining a state of charge of the battery module, determining a heating or cooling capability of a thermal management system utilized to heat or cool the battery module, and determining an amount of power available to the thermal management system and to the battery module from one or more power sources, where the one or more power sources comprise at least a regenerative braking system. Further, the method includes determining a desired temperature and a desired charge rate or capacity of the battery module based on the temperature of the battery module, the state of charge of the battery module, the heating or cooling capability of the thermal management system, the amount of power available to the thermal management system and to the battery module from the one or more power sources, or based on a combination thereof. Further, the method includes utilizing the thermal management system to heat or cool the battery module to the desired temperature. Further still, the method includes utilizing the one or more power sources to charge the battery module at the desired charge rate or capacity, and to provide excess power to the thermal management system.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, a battery system includes a battery module, a thermal management system (e.g., active thermal management system), and a battery system controller. The battery module and the thermal management system may receive power from various power sources disposed on a vehicle. For example, the battery module and the thermal management system may receive power from an alternator, from a regenerative braking system (e.g., which converts mechanical energy into electrical energy), and other sources (e.g., a photovoltaic system or another battery disposed in the vehicle). Further, the thermal management system may be powered at least in part by the battery module. The thermal management system may be an active thermal management system that heats and/or cools the battery module via, for example, fluid heating or cooling, or resistors (e.g., via hot or cold liquid or air).

In traditional configurations, electrical energy generated by a traditional regenerative braking system is either utilized to power a traditional battery, or is dumped or wasted. Because a traditional battery can only accept a certain amount of power based at least in part on the battery's temperature, often times, large amounts of excess energy of the traditional regenerative braking system is wasted.

In accordance with embodiments of the present disclosure, the excess energy that cannot be accepted by the battery module (e.g., due to insufficient temperature of the battery module) may be used to directly power the thermal management system. Further, since the thermal management system is capable of better heating (or cooling) the battery module after receiving the excess power from the regenerative braking system, the thermal management system may be better equipped for raising the temperature of (e.g., heating) the battery module, such that the battery module may accept more power (e.g., from the regenerative braking system, the alternator, other power sources, or a combination thereof). The battery system controller, in accordance with the present disclosure, is configured to instruct, either directly or indirectly (e.g., through an intervening vehicle controller) how much power each power source transmits to each of the battery module and the thermal management system. The battery system controller may determine how much power to enable the power sources to provide based on several factors, including but not limited to: a temperature of the battery module, a desired temperature of the battery module (e.g., to optimize power input to the battery module), a charge of the battery module, a charge capacity of the battery module, a current, resistance, or voltage of the battery module (or cells within the battery module), a state of function of the battery module, a state of health of the battery module, a charge of the thermal management system, a heating or cooling capability of the thermal management system, a temperature of the thermal management system, ambient temperature, or any combination thereof.

Figure 1:
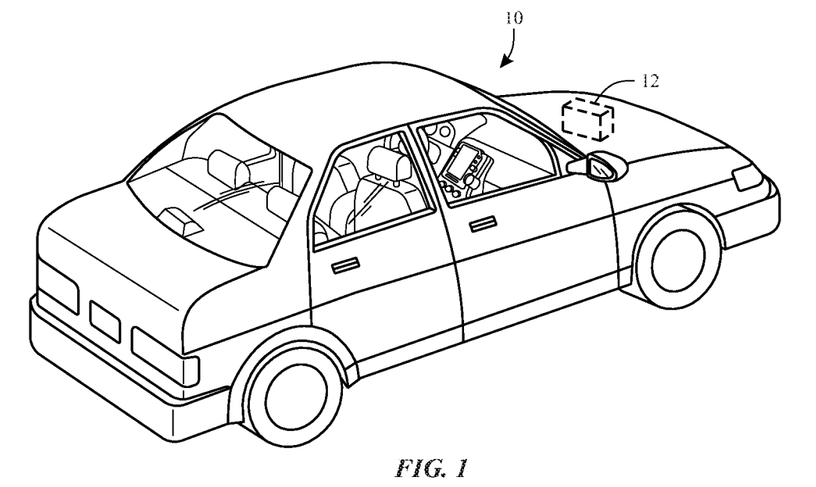
FIG. 1 is a perspective view of an embodiment of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

As previously described, the battery system 12 may include a battery module, a thermal management system, and a battery system controller. The battery system controller may be configured to determine an amount of power to enable one or more power sources (e.g., including an alternator and/or a brake regeneration system) to provide to both the thermal management system and the battery module. For example, the battery system controller may determine how much energy the brake regeneration system can provide the battery module, and may then divert excess energy to the thermal management system. The battery system controller may also determine an optimal or desired temperature of the battery module to cause the battery module to accept a greater amount of power (or a faster rate of charge). The battery system controller may make these determinations based on several factors relating to operating conditions of the battery module, operating conditions of the thermal management system, and the amount of power available via the one or more power sources. Certain of these and other features will be described in detail below with reference to the figures.

Figure 2:
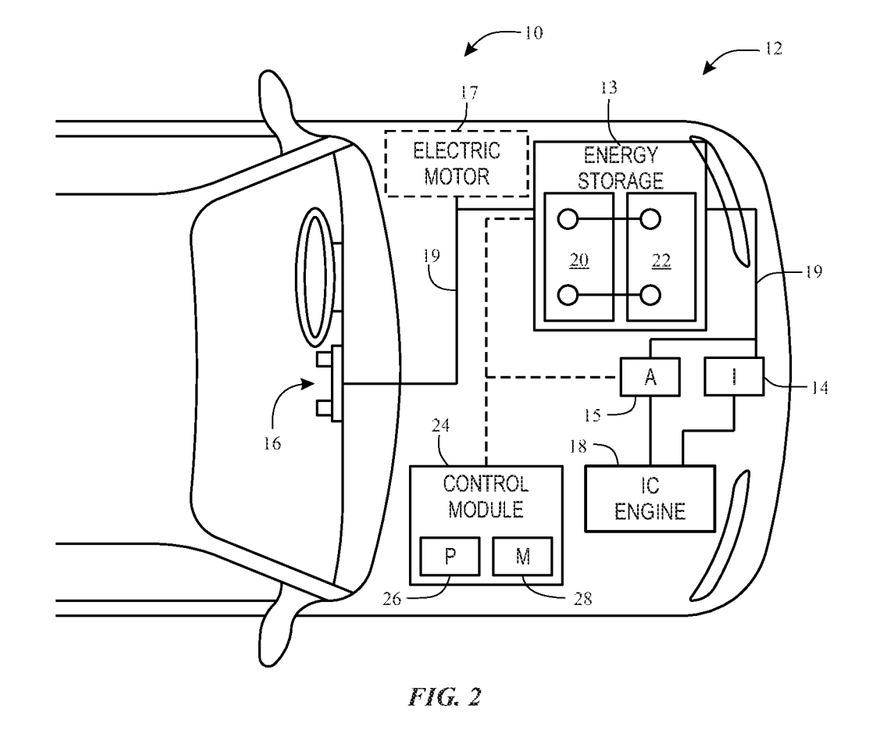
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, resistors, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. In other embodiments, regenerative braking energy may be captured by a separate regenerative braking system from the alternator 15 and/or the electric motor 17.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium-ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium-ion battery module 20 and lead-acid battery module 22 are depicted adjacent to one another, they may be positioned in different areas around the vehicle. For example, the lead-acid battery module 22 may be positioned in or about the interior of the vehicle 10 while the lithium-ion battery module 20 may be positioned under the hood of the vehicle 10.

In some embodiments, the energy storage component 13 may include multiple battery modules to utilize multiple different battery chemistries. For example, when the lithium-ion battery module 20 is used, performance of the battery system 12 may be improved since the lithium-ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Although not depicted in the illustrated embodiment, the battery system 12 may additionally include a thermal management system configured to heat or cool, for example, the lithium-ion battery module 20. The battery control module 24 (e.g., battery system controller) may be configured to determine an amount of power to enable one or more power sources (e.g., including the alternator 15, the electric motor 17, and/or the brake regeneration system [which may be separate from, or integrated with, the alternator 15 and/or the electric motor 17]) to provide to both the thermal management system and the battery module 20.

For example, the battery control module 24 (e.g., battery system controller) may determine how much energy the brake regeneration system can provide the battery module 20, and may then divert excess energy to the thermal management system. The battery control module 24 (e.g., battery system controller) may also determine an optimal or desired temperature of the battery module 20 to cause the battery module 20 to accept a greater amount of power (or a faster rate of charge). The battery system controller 24 may make these determinations based on several factors relating to operating conditions of the battery module 20, operating conditions of the thermal management system, and the amount of power available via the one or more power sources. Certain of these and other features will be described in detail below with reference to the figures.

Figure 3:
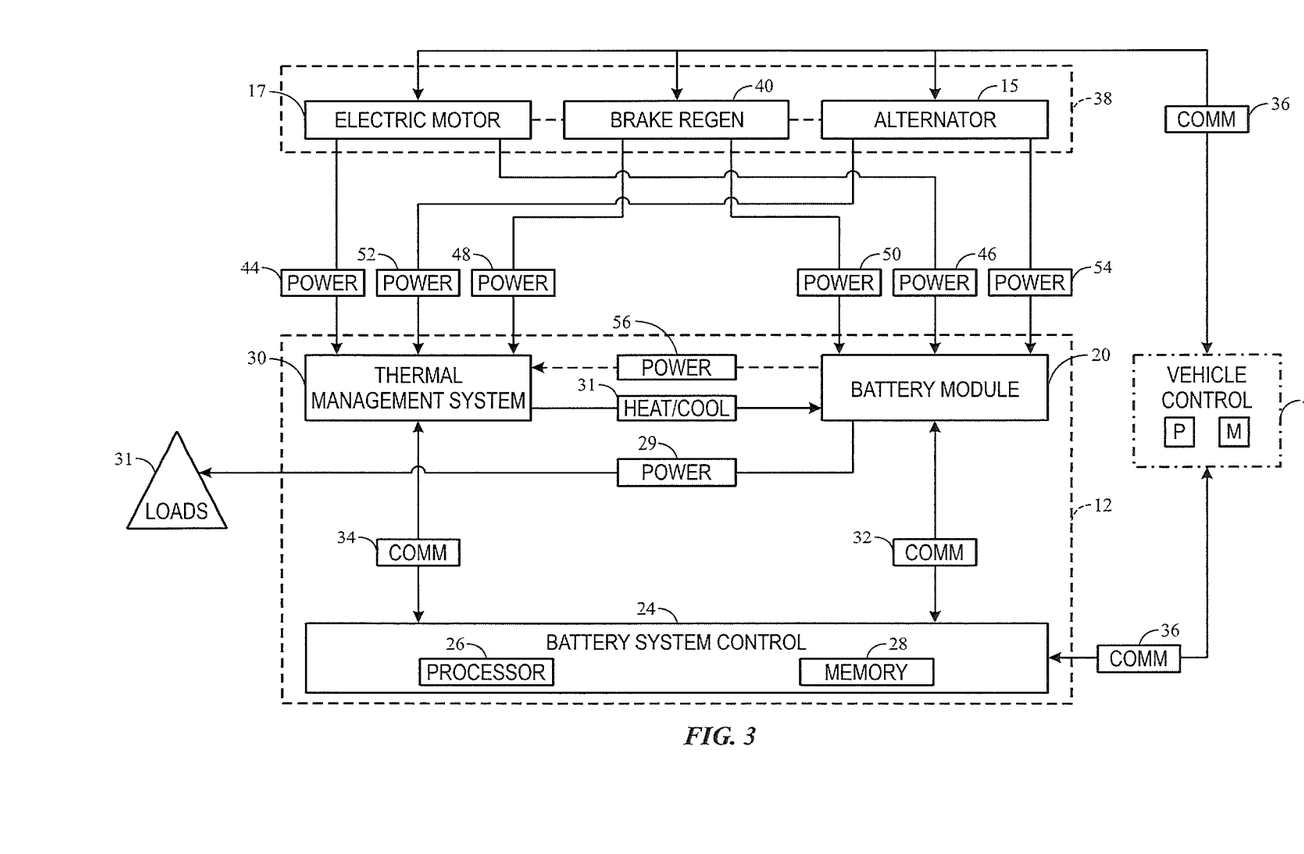
FIG. 3 is a schematic illustration of an embodiment of a battery system for use in the vehicle of FIGS. 1 and 2, in accordance with an aspect of the present disclosure.

Turning now to FIG. 3, a schematic illustration of an embodiment of the battery system 12 for use in the vehicles of FIGS. 1 and 2 is shown. In the illustrated embodiment, the battery system 12 includes the battery module 20 (e.g., lithium-ion battery module, 12V battery module) configured to power 29 a load 31, a thermal management system 30 configured to heat/cool 31 the battery module 20, and the battery system controller 24. As previously described, the thermal management system 30 may be an active system that heats or cools the battery module 20

The battery system controller 24 may be capable of one or two way communication 32 with the battery module 20, and one or two way communication 34 with the thermal management system 30. For example, the battery system controller 24 may receive data from the battery module 20 indicative of operating conditions of the battery module 20, which may include a temperature of the battery module 20, a charge of the battery module 20, a charge capacity of the battery module 20, a state of charge of the battery module 20, a state of health of the battery module 20, and a current, resistance, or voltage of the battery module 20 (or individual cells thereof). Further, the battery system controller 24 may receive data from the thermal management system 30 indicative of operating conditions of the thermal management system 30, such as a charge of the thermal management system 30, a heating or cooling capability of the thermal management system 30, and a temperature of the thermal management system 30. In some embodiments, the battery system controller 24 may receive data indicative of an ambient temperature surrounding the battery system 12. Further still, the battery system controller 24 may be capable of communicating back to the thermal management system 30 and/or to the battery module 20, to instruct the thermal management system 30 and/or the battery module 20 to carry out certain acts (e.g., the thermal management system 30 to heat/cool the battery module 20).

In addition to communicating with the thermal management system 30 and the battery module 20, the battery system controller 24 may be capable of one or two way communication 36 with a bank of power sources 38. For example, the bank of power sources 38 may include the alternator 15, the electric motor 17, and a brake regeneration system 40. In some embodiments, the brake regeneration system 40 may be incorporated in part or in full with the electric motor 17, the alternator 15, or both. Further, it should be noted that other power sources may be included in the bank of power sources 38, such as a photovoltaic system or another battery. It should also be noted that the battery system controller 24 may be capable of communicating with each power source of the bank of power sources 38 individually. Further, it should be noted that, in some embodiments, the battery system controller 24 may communicate with the bank of power sources 38 indirectly. That is, an intervening vehicle controller 42 may communicate back and forth with the bank of power sources 38, and the battery system controller 24 may communicate back and forth with the vehicle controller 42.

Each of the power sources of the bank of power sources 38 may be capable of providing power to both the battery module 20 and the thermal management system 30, or certain of the power sources of the bank of power sources 38 may be capable of providing power to only one of the battery module 20 or the thermal management system 30. In the illustrated embodiment, the electric motor 17 may power 44 the thermal management system 30, and the electric motor 17 may power 46 the battery module 20. Further, the brake regeneration system 40 may power 48 the thermal management system 30, and the brake regeneration system 40 may power 50 the battery module 20. Further still, the alternator 15 may power 52 the thermal management system 30, and the alternator 15 may power 54 the battery module 20. It should also be noted that, in some embodiments, the battery module 20 may directly power 56 the thermal management system 30.

In accordance with present embodiments, the battery system controller 24 includes the processor 26 and the memory 28, where the processor 26 is configured to execute instructions stored on the memory 28 to cause the battery system controller 24 (or the processor 26 thereof) to perform certain acts. For example, the battery system controller 24 may receive data indicative of the previously described operating conditions of the battery module 20 and of the thermal management system 30. The battery system controller 24 may determine, based on the operating conditions of the battery module 20 and of the thermal management system 30, a charge capacity or charge rate the battery module 20 is capable of accepting (e.g., which may be limited by a temperature of the battery module 20). Further, the battery system controller 24 may also determine a heating or cooling capability of the thermal management system 30 based on the operating conditions of the thermal management system 30, and may determine an ideal (e.g., desired) temperature of the battery module 20 (e.g., to enhance an amount of charge, or a rate of charge, the battery module 20 can accept) within the capabilities of the thermal management system 30. Thus, as described in detail below, the battery system controller 24 may be capable of instructing the thermal management system 30 to heat (or cool) the battery module 20 to a determined, ideal temperature, such that the battery module 20 can accept a greater amount of power, or accept the power at a faster rate.

Further still, the battery system controller 24 may receive data indicative of the amount of power each power source of the bank of power sources 38 (e.g., the electric motor 17, the brake regeneration system 40, and the alternator 15) has available (e.g., to charge the battery module 20 and/or the thermal management system 30). The battery system controller 24 may weigh the factors set forth above to determine an optimal instruction to (a) the bank of power sources 38 regarding how much power to supply to each of the thermal management system 30 and the battery module 20, and (b) the thermal management system 30 regarding how much to heat or cool the battery module 20. Thus, the battery system controller 24 may cause two actions to occur, namely, the bank of power sources 38 to supply a certain amount of power to the thermal management system 30 and to the battery module 20, and the thermal management system 30 to heat or cool the battery module 20 to a certain extent. In some embodiments, the battery system controller 24 may first instruct the thermal management system 30 to heat (or cool) the battery module 20 to the desired temperature or extent, and then may change the amount of power distributed to the battery module 20, or the rate at which the power is distributed to the battery module 20. Further, depending on the amount of power that is distributed to the battery module 20, the battery system controller 24 may instruct the bank of power sources 38 to distribute a different amount of power to the thermal management system 30.

As previously described, the battery system controller 24 may determine a first amount of power that the thermal management system 30 receives, and a second amount of power that the battery module 20 receives. The first amount of power and the second amount of power may not be the same. Further, the extent that each power source of the bank of power sources 38 contributes to the first amount of power (e.g., to the thermal management system 20) and to the second amount of power (e.g., to the thermal management system 30) may also not be the same. For example, the brake regeneration system 40 may supply more power to the thermal management system 30 than to the battery module 20, and the alternator 15 may supply more power to the battery module 20 than to the thermal management system 30. Further still, the total amount of power supplied by the brake regeneration system 40, the total amount of power supplied by the alternator 15, and the total amount of power supplied by the electric motor 17 may not be the same. By selectively determining how much, and to where, power from the various power sources is distributed, the battery system controller 24 may limit wasted power (e.g., power dumped from the brake regeneration system 40). As previously described, the determination of how much power is distributed, to where (e.g., thermal management system 30 and/or the battery module 20), and from where (e.g., the electric motor 17, the brake regeneration system 40, and the alternator 15) may depend on the operational conditions of the battery module 20 and of the thermal management system 30 described above.

Figure 4:
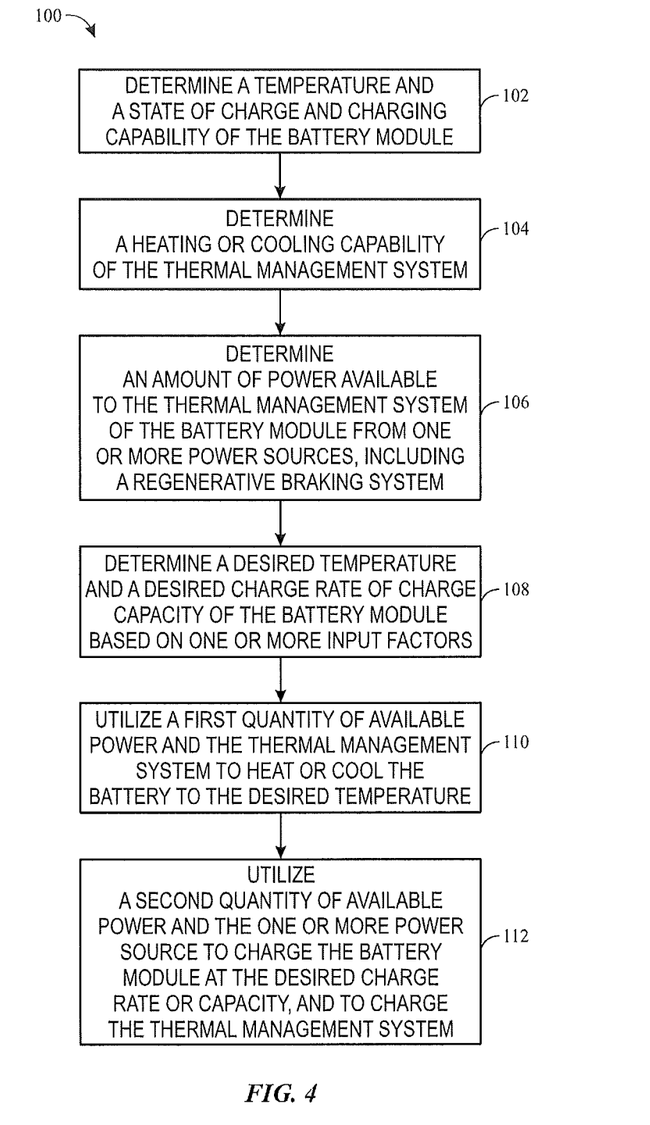
FIG. 4 is a process flow diagram illustrating an embodiment of a method of powering a battery module via the battery system of FIG. 3, in accordance with an aspect of the present disclosure.

Turning now to FIG. 4, an embodiment of a method 100 of powering a battery module via the battery system 12 of FIG. 3 is shown. In the illustrated embodiment, the method 100 includes determining (block 102) a temperature of the battery module and a state of charge or function of the battery module. For example, the battery system controller may receive data indicative of the temperature of the battery module and of the state of charge of the battery module from sensors integrated with (or separate from) the battery module. In certain embodiments, the battery system controller may receive data indicative of other parameters, such as of voltage, current, resistance, state of health, function state, or a charge capacity of the battery module. Further, in certain embodiments, functions such as charge capacity, state of health, function state, and others may be determined (e.g., inferred) by the battery system controller via analysis of the temperature and/or the state of charge of the battery module.

The method 100 also includes determining (block 104) a heating or cooling capability of a thermal management system utilized to heat or cool the battery module. For example, the battery system controller may receive data indicative of the heating or cooling capability of the thermal management system from a sensor integrated with (or separate from) the thermal management system. The heating or cooling capability of the thermal management system may be inferred or determined by the battery system controller via analysis of other parameters which the battery system controller may analyze (e.g., via receiving data indicative of such parameters, such as from sensors of the thermal management system). For example, the battery system controller may receive data indicative of a state of charge of the thermal management system, which may be a factor of the heating or cooling capability of the thermal management system. Further, the battery system controller, as set forth above, may receive the temperature of the battery module. The heating or cooling capability of the thermal management system (e.g., how much temperature change the thermal management system can affect to the battery module) may depend on the temperature of the battery module. Further still, the temperature of the thermal management system (and/or ambient temperature) may play a role in the heating/cooling capability of the thermal management system. Accordingly, the battery system controller may receive data indicative of the temperature of the thermal management system (and/or the ambient temperature), and may determine the heating or cooling capability of the thermal management system based at least in part on said temperatures.

The method 100 also includes determining (block 106) an amount of power available to the thermal management system and to the battery module from one or more power sources, wherein the one or more power sources include at least a regenerative braking system. For example, the battery system controller may be in electrical communication with the one or more power sources, such that the battery system controller can receive data indicative of the amount of power available. In some embodiments, a vehicle controller may be disposed between the battery system controller and the one or more power sources. The vehicle controller may determine the amount of power available from the one or more power sources, and communicate, to the battery system controller, data indicative of the amount of power available for the thermal management system and the battery module. It should be noted that the battery system controller may receive data indicative of the amount of power available from each power source of the one or more power sources (e.g., instead of receiving data indicative of a total amount of power available from all the power sources). Thus, the battery system controller may selectively determine, as set forth in detail below, where the amount of power available from each power source is distributed. Via said selective determination, the battery system controller may reduce an amount of energy that is wasted (e.g., dumped) over traditional configurations (e.g., from the regenerative braking system energy).

The method 100 also includes determining (block 108) a desired temperature and a desired charge rate or charge capacity of the battery module based on the temperature of the battery module, the state of charge of the battery module, the heating or cooling capability of the thermal management system, the amount of power available to the thermal management system and to the battery module from the one or more power sources, or based on a combination thereof. For example, the battery module may be able to accept more charge (and/or accept charge at a faster rate) at higher temperatures. In order to achieve higher temperatures, the thermal management system must heat the battery module, which expends energy of the thermal management system. Because the thermal management system and the battery module may share energy or power from the one or more power sources, the battery system controller determines (e.g., via optimization) the desired temperature of the battery module and the power split between the thermal management system and the battery module (e.g., from the one or more power sources). Thus, the battery system controller may run an algorithm (e.g., via the processor and stored on the memory) that incorporates several factors, including the current temperature of the battery module, the current charge capacity of the battery module, the state of function of the battery module, the state of health of the battery module, current, resistance, or voltage of the battery module, or some combination thereof, in addition to the heating/cooling capability of the thermal management system and the power available from the one or more power sources, and may predict or determine an idea condition of the battery module (e.g., temperature and/or charge rate or charge capacity) based on the analyzed factors.

The method 100 also includes utilizing (block 110) the thermal management system to heat or cool the battery module to the desired temperature. For example, as previously described, the battery system controller is in one or two way communication with the thermal management system. Accordingly, the battery system controller may instruct the thermal management system to heat or cool the battery module to a certain extent (e.g., to the desired temperature) to enhance the ability of the battery module to accept a charge (e.g., higher charge capacity or higher charge rate). It should be noted that the thermal management system may be an active management system that utilizes fluid (e.g., liquid or air) to heat or cool the battery module. For example, the thermal management system may include a heat exchanger through which the fluid is routed to heat or cool the fluid, and the heated or cooled fluid may be routed toward the battery module. It should also be noted that, in some embodiments, the thermal management system may be incorporated with a system other than the battery system (e.g., with a vehicle), and that the thermal management system may be utilized at least in part to heat or cool other components of the other system (e.g., other components of the vehicle)

The method 100 also includes utilizing (block 112) the one or more power sources to charge the battery module at the desired charge rate or capacity, and to charge the thermal management system. For example, as previously described, the battery module may be heated (or cooled) by the thermal management system such that the battery module reaches the desired temperature, where the desired temperature enables improved acceptance of charge by the battery module (e.g., higher charge capacity of faster charge rate). The battery system controller may first instruct the thermal management system to heat or cool the battery module to the desired temperature, and may then instruct the one or more power sources to provide increased power or charge to the battery module. In some embodiments, the battery system controller may progressively increase the amount of power (or the rate of power) distributed to the battery module from the one or more power sources as the temperature of the battery module rises. Further, as more power is delivered to the battery module, less power may be delivered to the thermal management system. However, in certain conditions, the available power may be such that, as the temperature of the battery module rises, the amount of charge (or rate of charge) to the battery module may be increased, while the amount of charge (or rate of charge) to the thermal management system does not decrease (e.g., remains the same or increases). Indeed, one technical advantage associated with embodiments of the present disclosure is utilization of the available power that would not otherwise by possible in traditional configurations, where traditional configurations may dump or waste certain available power (e.g., energy generated via a regenerative braking system).

One or more of the disclosed embodiments, alone or in combination, may provide one or more technical effects useful in the manufacture of battery modules, and portions of battery modules. In general, embodiments of the present disclosure include a battery system having a battery module, a thermal management system configured to heat or cool the battery module, and a battery system controller. The battery system controller may receive data indicative of several factors, including but not limited to a temperature of the battery module, a charge of the battery module, a charge capacity of the battery module, a current, resistance, or voltage of the battery module (or cells within the battery module), a state of function of the battery module, a state of health of the battery module, a charge of the thermal management system, a charge capacity of the thermal management system, a heating or cooling capability of the thermal management system, a temperature of the thermal management system, ambient temperature, an amount of power available to the battery module and to the thermal management system from one or more power sources, or any combination thereof. Based on one or more of these factors, the battery system controller may determine a desired temperature of the battery module, and may instruct the thermal management system to heat or cool the battery module to achieve the desired temperature.

The battery system controller may also determine an amount of power that the thermal management system and the battery module can accept. The amount of power the battery module can accept may be based on the temperature of the battery module. Thus, the desired temperature of the battery module may be determined, as set forth above, at least in part on a desired amount of charge (or rate of charge) of the battery module, as determined by the battery system controller. In order to save power from the one or more power sources (e.g., instead of dumping excess power), the power may be utilized to charge the thermal management system. For example, the regenerative braking system may distribute power to the thermal management system instead of dumping excess power. Since heating or cooling the battery module requires the use of power stored in the thermal management system, and because the battery module can accept more charge (or accept charge at a faster rate) by reaching the desired temperature, power from the one or more power sources is saved by powering the thermal management system to enable the heating or cooling, and providing more power to the battery module based on the battery module's higher charge capacity enabled by reaching the desired temperature affected by the thermal management system. In other words, embodiments of the present disclosure facilitate improved power usage, and facilitate a more optimal performance by the battery module (e.g., by improving an amount of charge or charge rate the battery module can accept). Improved performance of the battery module may also facilitate the use of smaller battery modules, thus increasing an energy density of the battery module and battery system as a whole. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery system for a vehicle, comprising:
a battery module;
a thermal management system; and
a battery system controller configured to, during operation of a vehicle:
receive data indicative of first operational conditions of the battery module and of second operational conditions of the thermal management system;
determine an amount of power available to the thermal management system and to the battery module from one or more power sources internal to the vehicle and external to the battery module;
determine a desired change to the first operational conditions of the battery module based on the amount of power available to the thermal management system and to the battery module; and
enable, to effect the desired change to the first operational conditions, the one or more power sources internal to the vehicle and external to the battery module to provide a first quantity of power to the thermal management system and a second quantity of power to the battery module, and the thermal management system to heat or to cool the battery module to a calculated extent.

2. The battery system of claim 1, wherein the first operational conditions comprise a temperature of the battery module, an ambient temperature, a state of charge, a charge capacity, a state of health, a state function, a resistance, a voltage, a current, or a combination thereof.

3. The battery system of claim 1, wherein the second operational conditions comprise a temperature of the thermal management system, an ambient temperature, a voltage, a current, a resistance, or a combination thereof.

4. The battery system of claim 1, wherein the one or more power sources comprise an alternator or a brake regeneration system.

5. The battery system of claim 1, wherein the one or more power sources comprises an alternator and a brake regeneration system.

6. The battery system of claim 5, wherein the alternator is used only to power the battery module, and not the thermal management system.

7. The battery system of claim 5, wherein energy provided by the brake regeneration system is split between the battery module and the thermal management system based on an amount of power the battery module can accept.

8. The battery system of claim 7, wherein the amount of power the battery module can accept is based on the temperature of the battery module.

9. The battery system of claim 1, wherein the one or more power sources comprise the battery module, and wherein the thermal management system is configured to be powered at least in part by the battery module.

10. The battery system of claim 1, wherein the thermal management system is directly integrated with the battery system.

11. The battery system of claim 1, wherein the thermal management system is a part of a vehicle in which the battery system is disposed.

12. The battery system of claim 1, wherein the thermal management system is an active heating and/or active cooling system.

13. The battery system of claim 1, wherein the one or more power sources comprises an alternator and a regenerative braking system, and wherein utilization of available power from the regenerative braking system is prioritized over utilization of available power from the alternator.

14. The battery system of claim 1, wherein the battery system controller first enables, by instructing, the thermal management system to heat or to cool the battery module to the calculated extent, and then enables the one or more power sources to provide the second quantity of power to the battery module.

15. A battery system controller for a vehicle, wherein the battery system comprises a processor and a memory, wherein the memory comprises instructions stored thereon that, when executed by the processor, cause the processor to, during operation of the vehicle:
determine a temperature of a battery module and a state of charge of the battery module;

determine a heating or cooling capability of a thermal management system;

determine an amount of power available, from one or more power sources internal to the vehicle, to the battery module and to the thermal management system;

determine a desired condition of the battery module based at least in part on the temperature of the battery module, the state of charge of the battery module, the amount of power available to the battery module or to the thermal management system, or a combination thereof; and cause, based at least in part on the desired condition, the one or more power sources internal to the vehicle and external to the battery to provide to the thermal management system and to the battery module a desired split of the amount of power available to the thermal management system and to the battery module, and the thermal management system to heat or cool the battery module to a calculated extent.

16. The battery system controller of claim 15, wherein the one or more power sources comprise a regenerative braking system, an alternator, or both.

17. The battery system controller of claim 15, wherein the calculated extent of heating or cooling the battery module is based on a compatibility of a temperature of the battery module with the desired condition of the battery module.

18. The battery system controller of claim 17, wherein the desired condition of the battery module comprises a charge rate or a charge capacity of the battery module.

19. The battery system controller of claim 15, wherein the battery system controller communicates with the one or more power sources by way of an intervening vehicle controller.

20. A method of charging a battery module for a vehicle, comprising, during operation of a vehicle:
determining a temperature of the battery module;
determining a state of charge of the battery module;
determining a heating or cooling capability of a thermal management system utilized to heat or cool the battery module;
determining an amount of power available to the thermal management system and to the battery module from one or more power sources internal to the vehicle and external to the battery, wherein the one or more power sources comprise at least a regenerative braking system;
determining a desired temperature and a desired charge rate or charge capacity of the battery module based on the temperature of the battery module, the state of charge of the battery module, the heating or cooling capability of the thermal management system, the amount of power available to the thermal management system and to the battery module from the one or more power sources internal to the vehicle, or based on a combination thereof;
utilizing the thermal management system to heat or cool the battery module to the desired temperature; and
utilizing the one or more power sources internal to the vehicle to charge the battery module at the desired charge rate or capacity, and to charge the thermal management system.

21. The method of claim 20, comprising utilizing an alternator as one of the one or more power sources.

22. The method of claim 20, comprising optimizing the desired charge rate or capacity and the desired temperature via an algorithm having inputs, wherein the inputs comprise the temperature of the battery module, the state of charge of the battery module, the heating or cooling capability of the thermal management system, the amount of power available to the thermal management system and to the battery module from the one or more power sources, or a combination thereof.

* * * * *

UNITED STATES PATENT AND TRADEMARK OFFICE
CERTIFICATE OF CORRECTION

PATENT NO. : 10,661,663 B2
APPLICATION NO. : 15/166060
DATED : May 26, 2020
INVENTOR(S) : Zhang et al.

Page 1 of 1

It is certified that error appears in the above-identified patent and that said Letters Patent is hereby corrected as shown below:

On the Title Page

1. In Item (73), under "Assignee", in Column 1, Line 1, delete "CPS Technology Holdings, LLC," and insert -- CPS Technology Holdings LLC, --, therefor.

In the Specification

2. In Column 1, Line 10, delete "SELF-ADJUST BATTERY SYSTEM TO SELF-ADJUST" and insert -- STAND-ALONE BATTERY SYSTEM TO SELF-ADJUST --, therefor.

3. In Column 1, Line 43, delete "full hybrid systems (FHEVs)" and insert -- full hybrid electric vehicles (FHEVs) --, therefor.

4. In Column 1, Line 46, delete "mild hybrid systems (MHEVs)" and insert -- mild hybrid electric vehicles (MHEVs) --, therefor.

5. In Column 3, Line 52, delete "DRAWINGS" and insert -- BRIEF DESCRIPTION OF THE DRAWINGS --, therefor.

6. In Column 8, Line 10, delete "module 20" and insert -- module 20. --, therefor.

7. In Column 10, Line 2, delete "thermal management system 20)" and insert -- thermal management system 30) --, therefor.

8. In Column 12, Line 19, delete "the vehicle)" and insert -- the vehicle). --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*